US012688745B2

(12) United States Patent
Sato et al.

(10) Patent No.: US 12,688,745 B2
(45) Date of Patent: Jul. 21, 2026

(54) OPTICAL SENSOR FOR BILL VALIDATION

(71) Applicant: JAPAN CASH MACHINE CO., LTD., Osaka (JP)

(72) Inventors: Taichi Sato, Osaka (JP); Nobuo Takashima, Osaka (JP); Kenta Yuji, Osaka (JP); Kosuke Masuda, Osaka (JP); Toru Seki, Osaka (JP)

(73) Assignee: JAPAN CASH MACHINE CO., LTD., Osaka (JP)

( * ) Notice: Subject to any disclaimer, the term of this patent is extended or adjusted under 35 U.S.C. 154(b) by 176 days.

(21) Appl. No.: 18/576,015

(22) PCT Filed: Jun. 2, 2022

(86) PCT No.: PCT/JP2022/022427

§ 371 (c)(1),
(2) Date: Jan. 2, 2024

(87) PCT Pub. No.: WO2023/013225

PCT Pub. Date: Feb. 9, 2023

(65) Prior Publication Data

US 2024/0312280 A1 Sep. 19, 2024

(30) Foreign Application Priority Data

Aug. 6, 2021 (JP) ................................ 2021-130379

(51) Int. Cl.
*G07D 7/20* (2016.01)

(52) U.S. Cl.
CPC ........... *G07D 7/20* (2013.01); *G07D 2207/00* (2013.01)

(58) Field of Classification Search
CPC ........ G07D 7/20; G07D 2207/00; G07D 7/00; G07D 7/121; G07D 11/40; G07D 7/12
See application file for complete search history.

(56) References Cited

U.S. PATENT DOCUMENTS 7,182,197 B2 2/2007 Nago et al.
7,677,379 B2 3/2010 Nago et al.
(Continued)

FOREIGN PATENT DOCUMENTS

CN 105139516 A 12/2015
DE 102006052798 A1 5/2008
(Continued)

OTHER PUBLICATIONS

Extended European Search Report dated Aug. 5, 2024, issued in corresponding European Patent Application No. 24169651.7.
(Continued)

*Primary Examiner* — Jennifer D Bennett
(74) *Attorney, Agent, or Firm* — Bachman & LaPointe, P.C.

(57) ABSTRACT

An object of the present invention is to easily assemble and exchange a reflection type optical device and their parts in an optical sensor for bill validation by fitting unitized housings into openings of partitions. The optical sensor for bill validation includes a reflection type optical device (13, 30) that has a housing (41) for receiving an optical component (40) and also forming a part of a bill passageway (20). The housing (41) has a lid (42) and a box (43), the lid (42) being formed of light-permeable materials to allow lights irradiated from the inner optical component (40) and lights reflected on the bill to pass through the lid (42), and the box (43) surrounding the inner optical component (40) in combination with the lid (42) that is fit into an opening (53) formed in a partition (11, 12).

11 Claims, 6 Drawing Sheets

(56) References Cited

U.S. PATENT DOCUMENTS

| | | | | |
|---|---|---|---|---|
| 7,677,380 | B2 | 3/2010 | Nago et al. | |
| 8,348,042 | B2 | 1/2013 | Nago et al. | |
| 2004/0240722 | A1* | 12/2004 | Tsuji | G07D 7/121 382/137 |
| 2005/0029075 | A1 | 2/2005 | Suzuki | |
| 2009/0302529 | A1* | 12/2009 | Seki | G07F 7/04 271/265.01 |
| 2010/0000312 | A1* | 1/2010 | Nommer | G07D 7/12 73/159 |
| 2022/0078303 | A1* | 3/2022 | Matsui | G02B 6/001 |

FOREIGN PATENT DOCUMENTS

| | | | |
|---|---|---|---|
| EP | 3951699 | A1 | 2/2022 |
| JP | 4334910 | B2 | 9/2009 |
| JP | 2009295125 | A | 12/2009 |
| JP | 4484211 | B2 | 6/2010 |
| JP | 4522952 | B2 | 8/2010 |
| JP | 2011043926 | A | 3/2011 |
| JP | 5227087 | B2 | 7/2013 |
| JP | 5529318 | B2 | 6/2014 |
| JP | 2017194849 | A | 10/2017 |
| JP | 6823739 | B2 | 2/2021 |
| TW | 200508994 | A | 3/2005 |
| TW | 202101393 | A | 1/2021 |
| WO | 2009150774 | A1 | 12/2009 |
| WO | 2020202985 | A1 | 10/2020 |

OTHER PUBLICATIONS

Taiwanese Office Action dated Apr. 10, 2023 issued in corresponding Taiwan Patent Application No. 111125877.

International Search Report and Written Opinion dated Jul. 5, 2022 for corresponding application PCT/JP2022/022427.

* cited by examiner

OPTICAL SENSOR FOR BILL VALIDATION

TECHNICAL FIELD

This invention relates to an optical sensor for bill validation with a unitized optical device stored in a housing with a lid that forms a part of a bill passageway for guiding a carried bill.

BACKGROUND ART

Up till now, there have been developed various kinds of optical sensors for bill validation. For example, Patent Document 1 below demonstrates a bill image sensor that comprises a pair of detectors of the same construction disposed in the opposite side of a passageway for guiding carried bills. The detectors each comprise a first illuminator for emitting lights toward a first image detection area on a surface of a bill, a second illuminator for emitting lights toward a second image detection area other than the first image detection area to detect the optical images of first and second detection areas by detectors provided in image detection sensors disposed on the opposite side of the passageway to establish both images of opposite bill surfaces by transmitted and reflected lights.

Patent Document 2 discloses an optical sensor of improved validation performance that comprises two or three pairs of coaxial-lead type light emitting diodes and photo-transistors arranged across a bill transport passageway to detect a plurality of optical features of valuable papers.

Patent Document 3 shows an image readout apparatus that comprises transport means for conveying an aimed object with its light-permeable sections of black and white watermarks, a transmittable illuminant arranged in one side of the aimed object for diagonally emitting lights toward an irradiated area of the aimed object in the predetermined tilt angle relative to a vertical plane of the aimed object, a cylindrical lens array arranged in parallel to a vertical plane of the aimed object in the other side for converging transmitted diffused lights radiated from the illuminant and scattered and reflected by protrusions of black and white watermarks of the aimed object, and an optical sensor for receiving the transmitted diffused lights converged by the cylindrical lens to yield outputs per line of the protrusions. The apparatus is advantageous as the optical sensor may receive transmitted diffused lights that pass through black and white watermarks of the aimed object to read out watermarks in the aimed object.

Patent Document 4 illustrates a document handler with a casing made up of a lower cover and a lower case to define a transport passageway. The lower cover is formed of light-permeable and water-repellent synthetic resins to form a bottom surface of the transport passageway. The lower case has a lower tray attached to the lower cover to form the structure to arrange a lower sensor of a sensing device between the lower cover and lower tray, however, this structure is disadvantageous as it needs to make the whole casing of light-permeable materials.

Patent Document 5 exhibits document readers for reading out images on a manuscript conveyed along a passageway formed between transport rollers. The document reader comprises illuminant units for irradiating lights toward the manuscript, and image sensing units for receiving lights transmitted through and reflected on the manuscript. Specifically, image sensing units are designed to detect lights reflected on the manuscript to which lights are irradiated from above the manuscript, and also to detect lights irradiated from the illuminant unit and passed through the manuscript. Moreover, image sensing units can read out lights that are irradiated from below of the manuscript and then reflected on a bottom surface of the manuscript. Image sensing units of the same structure are point-symmetrically arranged around a central point. The document reader of Patent Document 5 is beneficial as it may serve to provide image sensing units and document readers with small-sized illuminant units.

Patent Document 6 shows a document validator that comprises light emitters for radiating lights toward one surface of a moving document, a plurality of photoreceivers arranged perpendicularly to the moving direction of the document and opposite to both surfaces of the document to detect lights transmitted through the moving document, an image data producer for creating image data of gradation according to the amount of lights detected by the photoreceiver, a white-reference data storage for storing white-reference data produced by irradiating lights to a white-reference member used for shading correction to image data, and a controller for regulating to a given value the white-reference data that is used for shading correction of image data from photoreceiver. The document validator of Patent Document 6 is advantageous in reduction in contrast inconsistency of image data because of suitable shading correction in document images.

PRIOR ART DOCUMENTS

Patent Literature

Patent Document 1: Japanese Patent No. 4,334,910
Patent Document 2: Japanese Patent No. 4,484,211
Patent Document 3: Japanese Patent No. 4,522,952
Patent Document 4: Japanese Patent No. 5,227,087
Patent Document 5: Japanese Patent No. 5,529,318
Patent Document 6: Japanese Patent No. 6,823,739

SUMMARY OF INVENTION

Technical Problem

There has been no proposal of optical sensor for bill validation that have their structure with a housing of a unitized optical device fit into an opening of light-permeable partitions for forming a bill passageway, and therefore, prior art optical sensors are defective in construction that would hinder smooth assemblage and exchange of the optical device and its parts.

An object of the present invention is to provide an optical sensor for bill validation that comprises a unitized housing fit into an opening formed in a partition for accommodating a reflection type optical device in the unitized housing to facilitate assemblage and exchange of the unitized housing and its parts received within the opening.

Solution to Problem

The optical sensor for bill validation according to the present invention, comprises a pair of partitions (11, 12) arranged in spaced and parallel relation to each other, a bill passageway (20) defined between the pair of partitions (11, 12) and a reflection type optical device (13, 30) assembled in at least one of the pair of partitions (11, 12) to form a part of the bill passageway (20). Reflection type optical device (13, 30) has a housing (41) that comprises a lid (42) and a casing (43) to hold an optical component (40) between the lid (42) and casing (43), the lid (42) being formed of light-permeable materials to allow lights irradiated from the optical component (40) and reflected on the bill to pass through the lid (42), and the casing (43) enclosing the optical component (40) in combination with the lid (42). The lid (42) of the housing (41) is fit into an opening (53) of at least one of the partitions (11, 12) to make the lid (42) form a part of the bill passageway (20).

The unitized housing (41) that contains the optical component (40) may be fit into openings (53) formed in at least one of the partitions (11, 12) so that the housing (41) may be easily and advantageously incorporated into and removed from the sensor device for bill validators for the exchange of the optical component (40). Moreover, the lid (42) of the housing (41) may serve as a part of the bill passageway (20) while reducing its conventional parts to make the whole sensor device in smaller size while conveniently increasing the freedom degree for arranging the optical component (40). If the housing (41) has an electrified lid (42), it may be formed of the possibly smallest area to eliminate the electrified area of the lid (42), and if the lid (42) of the housing (41) is made of transparent or opaque yet light-transmissible materials, partitions may be formed of light-impermeable materials, unlike the structure shown in Patent Document 4 that needs the whole partitions made of light-permeable materials. The casing (43) and lid (42) of the housing (41) together define a fluid-tight inner chamber (49) that can hold the internal optical component (40) off invasion of exogenous harmful materials.

DETAILED DESCRIPTION

Figure 1:
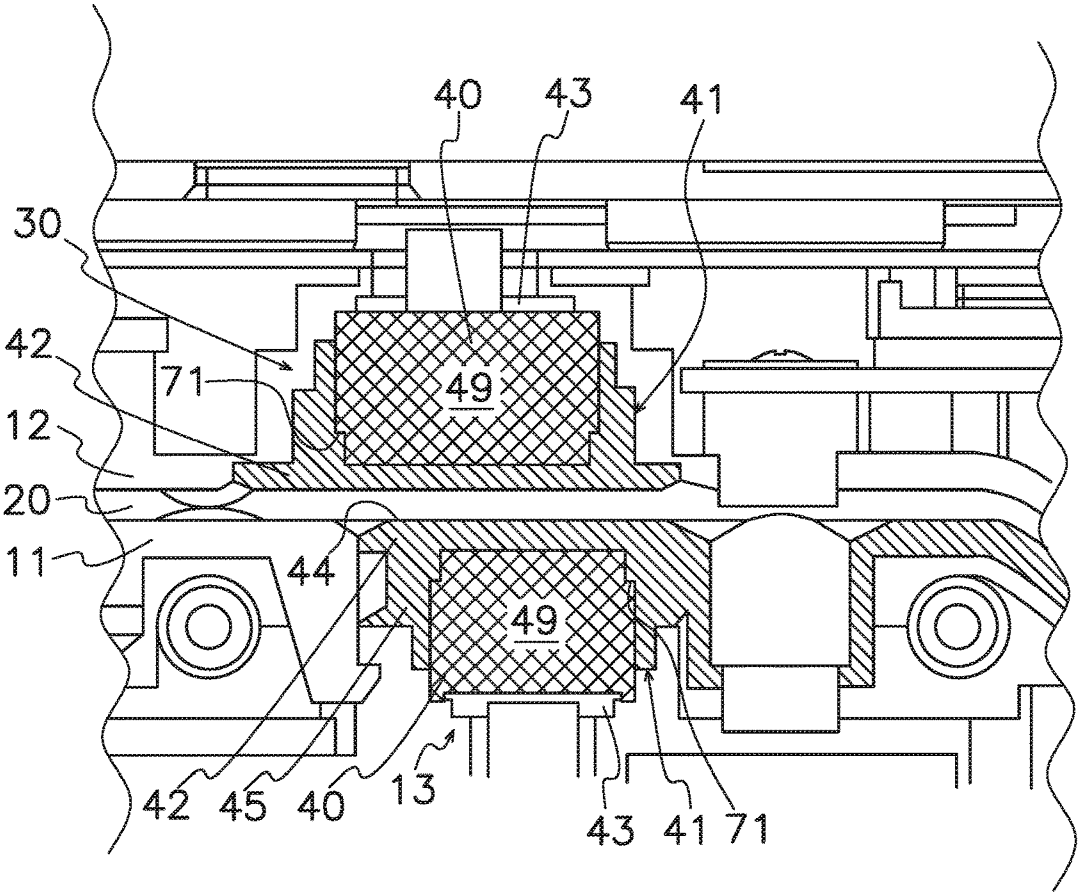
FIG. 1 A sectional view of the optical sensor for bill validation according to the present invention FIG. 2 A perspective view of the optical sensor FIG. 3 An exploded perspective view of the optical sensor FIG. 4 A plan view of a lid attached to the optical sensor FIG. 5 A plan view of the lid with an optical device removed FIG. 6 A sectional view of a housing used in the optical sensor FIG. 7 A plan view of a part of the housing shown in FIG. 6
Figure 2:
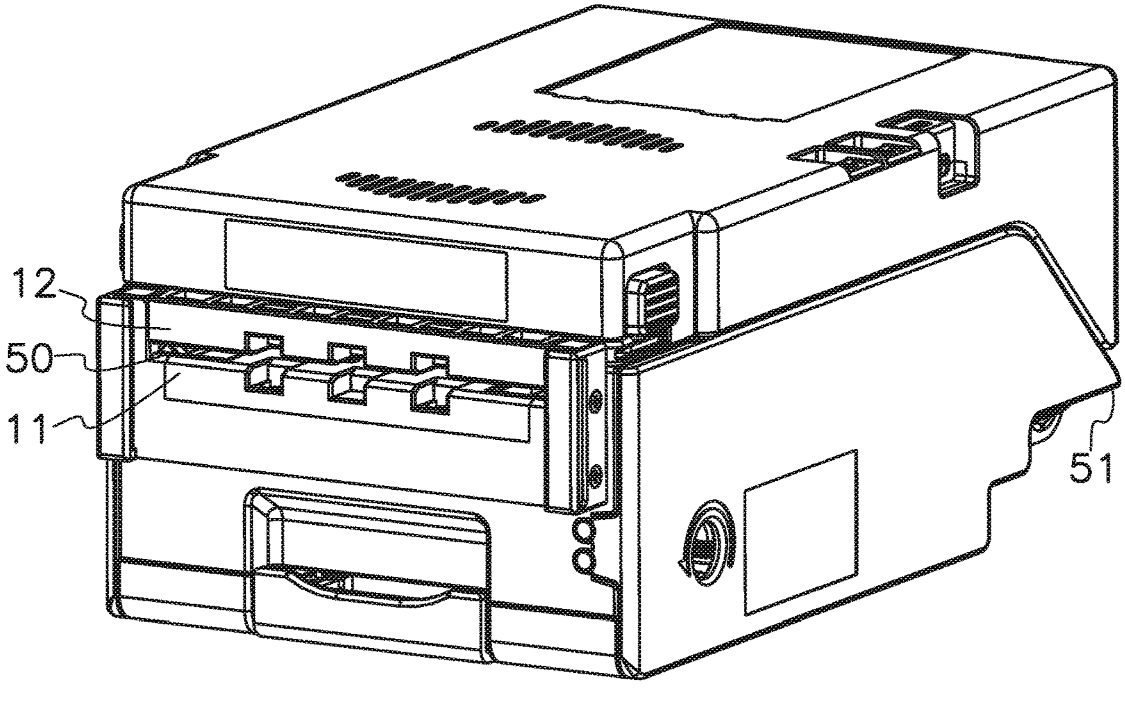
Figure 8:
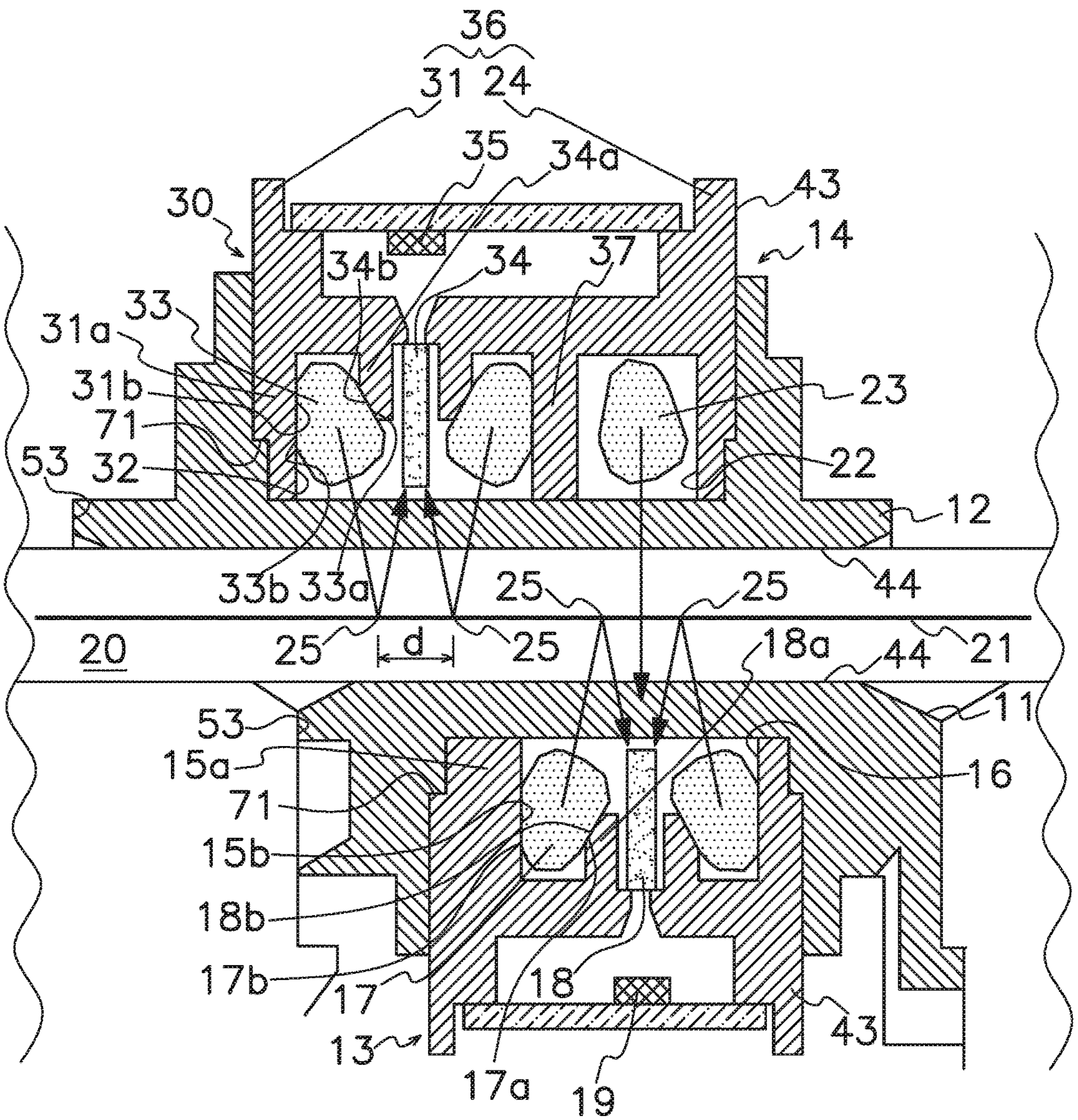
FIG. 8 A detailed sectional view showing the interior of the optical device

The optical sensor shown in FIG. 1 for bill validations according to the present invention, comprises a pair of lower and upper partitions 11, 12 arranged in spaced and parallel relation to each other, and a bill passageway 20 defined between the pair of partitions 11, 12 that each are formed of light-permeable or light-impermeable materials such as polycarbonate resins, acrylic resins and glass or the like. When a bill is inserted into a bill passageway 20, it is transported along bill passageway 20 by drive means such as pairs of rollers and/or carrier belts in the same way as in prior art apparatuses. Each of reflection type optical device 13, 30 has in common a housing 41 for accommodating an optical component 40. The housing 41 comprises a lid 42 and a casing 43 for together defining a fluid-tight inner chamber 49 to hold the optical component 40 that comprises photodetectors 19, 35 as shown in FIG. 8 such as known contact type image sensors (CIS), image point sensors or their combined sensors.

Each of lids 42 forms a part of housings 41 in light-reflective optical device 13, 30, and is made of light-permeable materials to allow lights irradiated from optical components 40 within housings 41 and also lights reflected on bill to transmit through lids 42, so that each of casings 43 surrounds optical component 40 in corporation with lids 42 to form unitary housings 41 for accommodating optical components 40. Lids 42 are made of transparent or opaque light-permeable materials similarly to or unlike partitions 11, 12, but casings 43 do not need to be made of light-permeable materials. In this way, each of optical component 40 is disposed within a fluid-tight chamber 49 defined by casing 43 and lid 42 that would positively prevent invasion into chamber 49 of foreign materials that may cause degradation of optical components 40.

Figure 3:
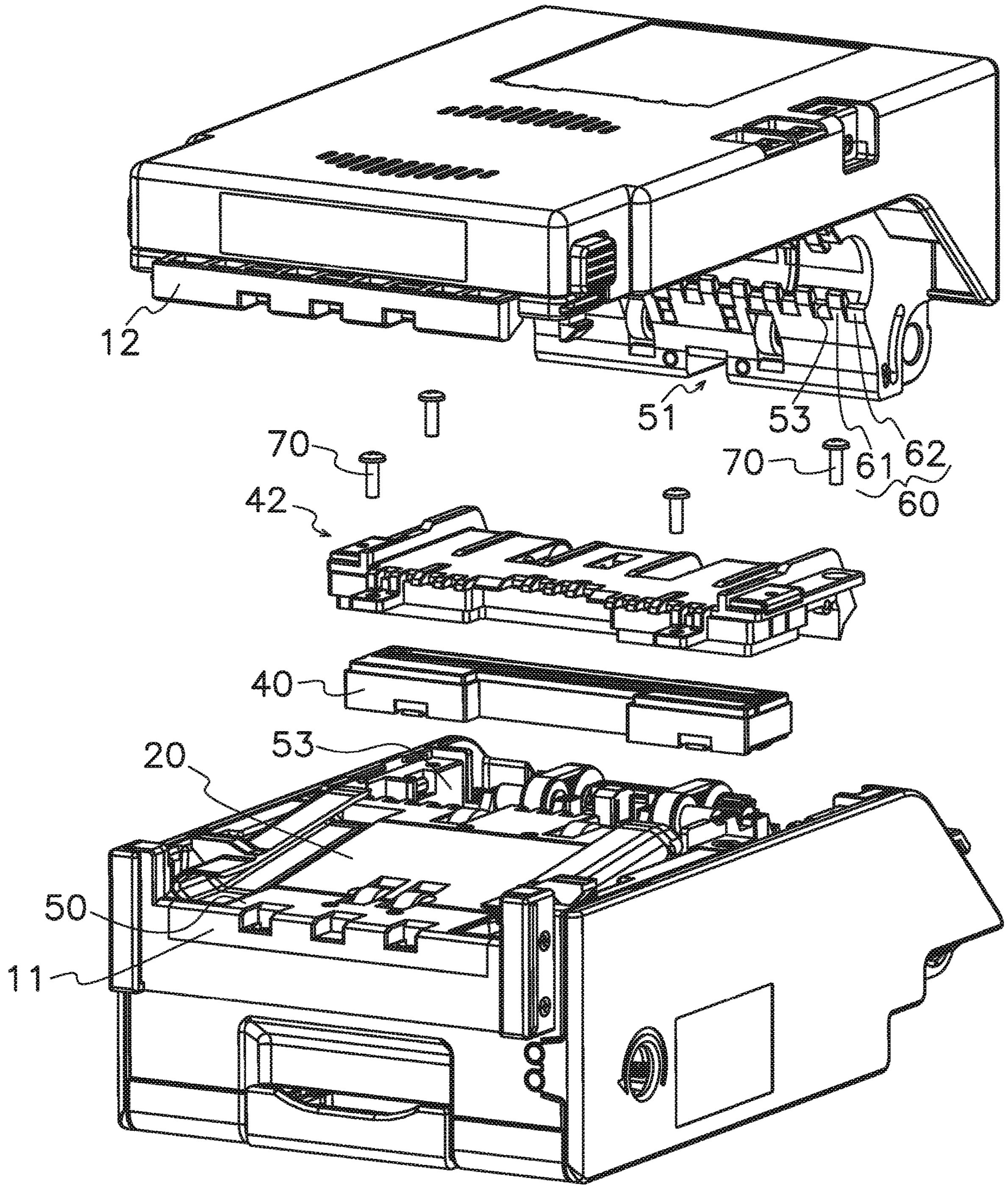
Figure 4:
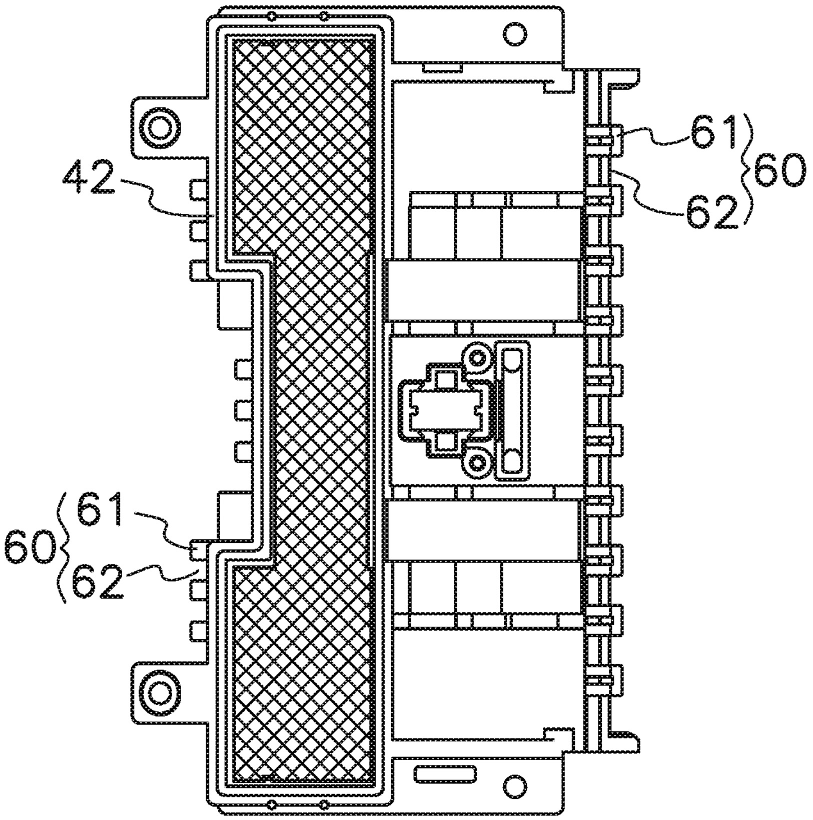

FIG. 3 shows two petitions 11 and 12 that are respectively disposed below and above bill passageway 20, and each of petitions 11, 12 is divided into two parts, namely bill inlet and outlet sides 50 and 51 along passageway 20. Widthwise formed at bill inlet and outlet sides 50 and 51, are rugged abutments 60 that include alternately shaped plural tenon 61 and plural mortise 62 formed on edges of openings 53 to be removably fit in mating rugged abutments formed in lids 42 of housings 41 (FIG. 4) of complementary shape of optical components 40 in optical device 13, 30 to allow lids 42 fit in openings 53 to form bill passageway 20 in cooperation with partitions 11 and 12.

The outer walls of each lid 42 (FIG. 6) in optical device 13, 30 comprises a passageway wall 44 (FIG. 8), lid side walls 45 (FIG. 6) and flange wall 46; passageway wall 44 of lid 42 is disposed to be flush with an outer surface of partitions 11, 12 along bill passageway 20 (FIG. 1); lid side walls 45 enclose a part of side walls of optical components 40 besides extending from passageway wall 44; and flange walls 46 extend from lid side wall 45 in parallel to passageway wall 44. Each of casings 43 in optical device 13, 30 shown in FIG. 6 comprise box side walls 47 for covering opposite side walls of optical component 40 and a box bottom wall 48 connected to box side walls 47 to cover a bottom surface of optical component 40. Flange walls 46 of lid 42 are secured to one of box side walls 47 by a removable screw 70 of fixing means. Each of casings 43 shown in FIG. 6 is connected to a related lid 42 by a fluid-tight fitted structure 71 of Z-section formed between lid 42 and casing 43 to contact lid 42 and casing 43 with stepped Z-sectional surfaces between lid 42 and casing 43 that would provide longer creeping distances than simple plane contacts while well preventing invasion into chamber 49 of foreign materials.

Figure 5:
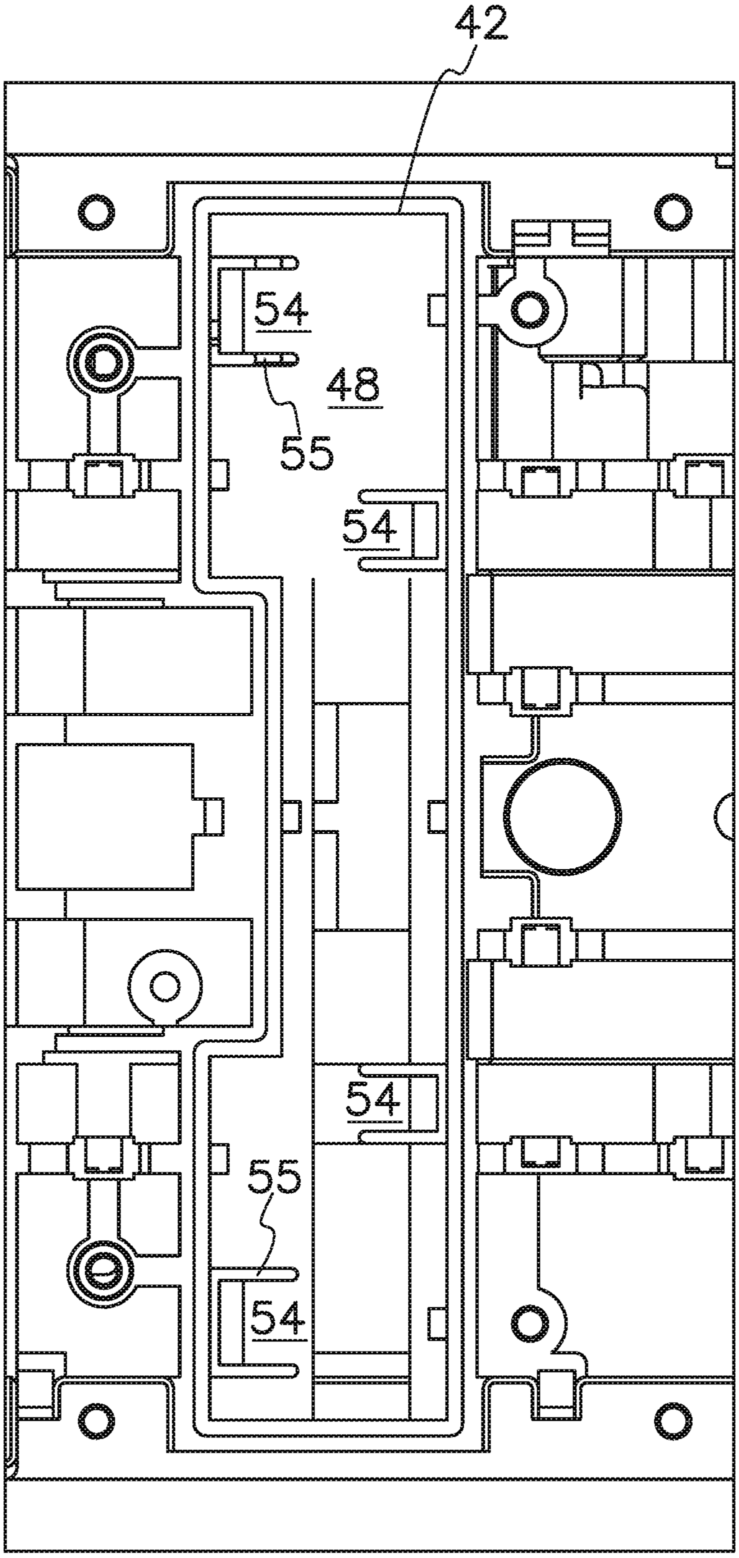

The box bottom wall 48 of each casing 43 comprises U-shaped notches 55 and tongues 54 (FIG. 5) formed by notches 55 to generate their own elastic force of deformedly mounted tongues 54 that forcibly urge optical components 40 toward an inner surface of passage walls 44 in lid 42, preventing emergence of a gap between the inner surface of passage wall 44 and optical components 40. For that reason, the invention's optical sensor is advantageous in always keeping optical components 40 in their accurate position, in a correct direction and within a shortest spaced distance toward bill 21 passing along bill passageway 20 without rattling movement of the content in chamber 49 if optical components 40 shown in FIG. 8 have first light guides 17, 33 for light reflection and a second light guide 23 for light-transmission. In contrast thereto, casings 43 do not need to be made of light-permeable materials, but need to be formed of materials to produce their own elastic force by integrally-formed tongues 54. For instance, each of tongues

Figure 6:
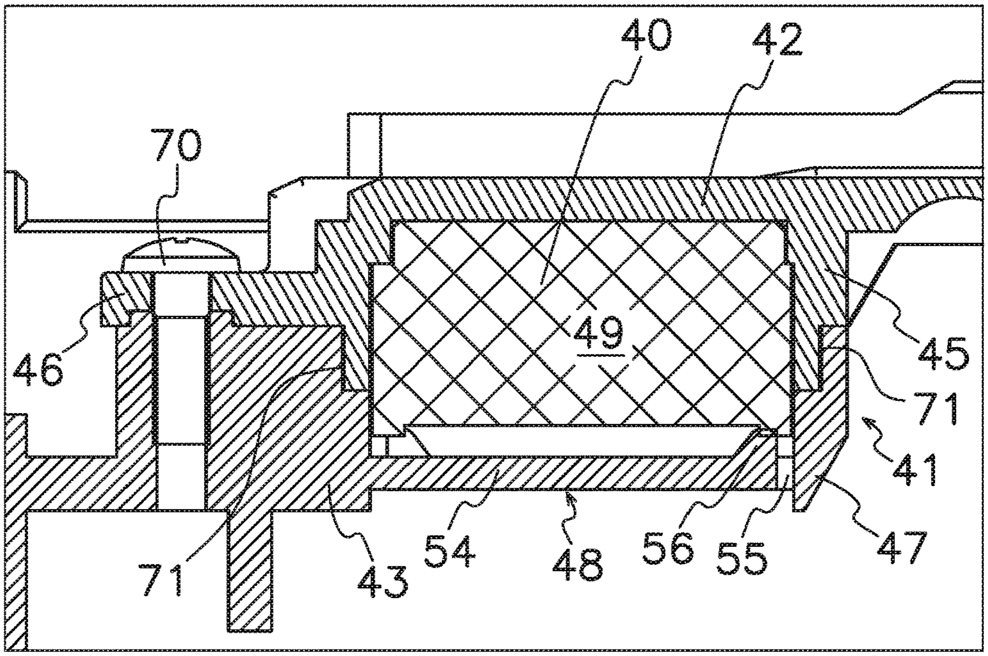
Figure 7:
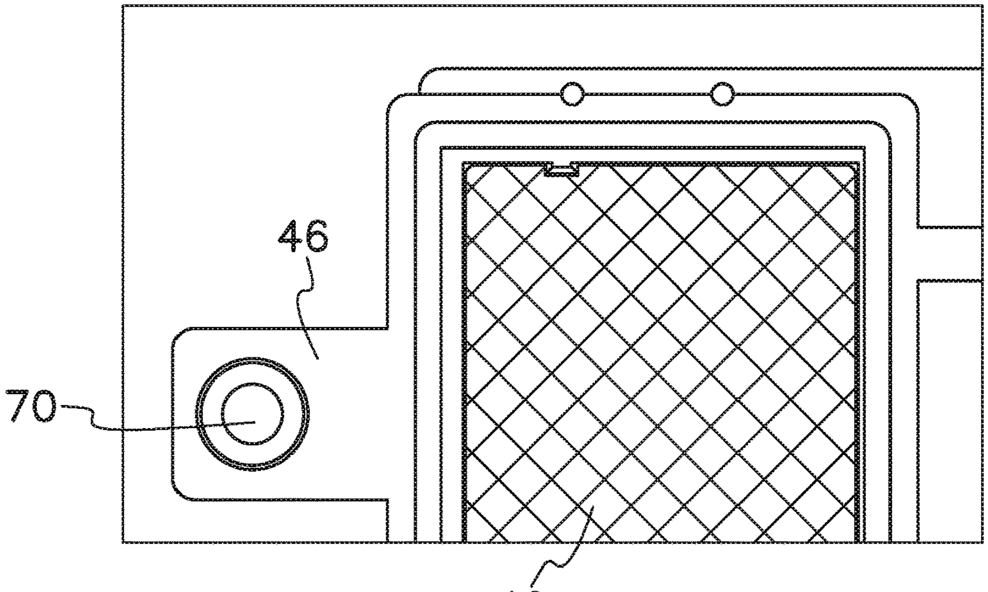

54 has an inner lug 56 at the top shown in FIG. 6 to generate resilient force that urges optical components 40 toward lids 42.

Front and rear ends of each lid 42 have traverse rugged abutments 60 each formed with alternately shaped or concavo-convex tenons 61 and mortises 62. Longitudinal ends of partitions 11, 12 have bill inlet and outlet sides 50, 51 formed with traverse complementary rugged abutments opposite to rugged abutments 60 with edges of openings 53. In other words, made at front and rear ends of each lid 42 are rugged abutments 60 shaped with tenons 61 and mortises 62 (FIG. 4), and in accordance with rugged abutments 60 of each lid 42, each of partitions 11 and 12 has related ends of openings 53 formed with rugged abutments 60 of corresponding tenons 61 and mortises 62 (FIG. 3). Accordingly, when lids 42 are fit into openings 53 of each of partitions 11 and 12, mortises 62 and tenons 61 of rugged abutments 60 in lids 42 (in FIG. 4) can removably engage and connect with tenons 61 and mortises 62 of rugged abutments 60 formed on edges of openings 53 (FIG. 3) of partitions 11 and 12 to bring outer surfaces of lids 42 to be flush with outer surfaces of partitions 11 and 12 to together provide a smooth bill passageway 20. Repetitively, lids 42 of housings 41 are engaged with openings 53 of related partitions 11 and 12 while tenons 61 and mortises 62 of rugged abutments 60 in lids 42 (FIG. 4) properly mesh with mortises 62 and tenons 61 of rugged abutments 60 formed on openings 53 (FIG. 3) of partitions 11 and 12 to define smooth lower and upper walls of bill passageway 20 shown in FIG. 8.

FIG. 1 illustrates first and second reflective optical devices 13 and 30 arranged respectively below and above bill passageway 20 to irradiate lights from first and second reflective optical devices 13 and 30 toward respectively bottom and upper surfaces of bill. In the embodiment of the invention shown in FIG. 1, first and second optical devices 13 and 30 have housings 41 to each receive an optical component 40, and optical component 40 of first optical device 13 is smaller than that of second optical device 30, however both optical components 40 may be in the same or differently sizes. Optical components 40 may hold housings 41 of the same or different size in shape that may be of the same or different kinds so far as first and second optical devices 13 and 30 serve to detect optical features on bottom and upper surfaces of bill.

As above-mentioned, the present invention is directed to the optically sensing device for bill validators that advantageously can be made or assembled in unitization with housings 41 for receiving optical components 40 to increase flexibility for arranging optical components 40. Also, unitized housings 41 can be removably fit into openings 53 of partitions 11, 12 for easy assemblage and simple exchange of housings 41 in the optically sensing device for bill validation. Moreover, lids 42 of housings 41 may be conveniently made of transparent or opaque light-permeable materials without need of making whole partitions 11 and 12 of light-permeable materials. Lids 42 can be formed with a possibly smallest electrified region to restrict its electrostatic property.

The embodiment of the present invention shown in FIG. 8, would include four kinds of the technical Ideas that may be divided into A to D:

A. Bill validation utilizing a light-reflective optical device 13 or 30 arranged below or above bill passageway 20 for irradiating lights that are regularly reflected on one surface of bill toward a photoreceiver;

B. Bill validation utilizing both first and second optical devices 13 and 30 for radiating lights on a bill's surface along a linear light scanning line and lights that transmit the bill;

C. Bill validation utilizing first and second optical devices 13 and 30 for emitting a pair of lights that are reflected on both surfaces of bill; and D. Bill validation utilizing both first and second optical devices 13 and 30 for giving off a pair of lights that are reflected on both surfaces of bill and lights that penetrate bill.

FIG. 8 shows the optically sensing device for bill validators according to Idea A that comprises reflective optical devices 13, 30 whose housings 41 each are formed of light-permeable materials to be fit into openings 53 of partitions 11, 12. Each of reflective optical devices 13, 30 comprises a reflective casing 43 for forming a housing 41, reflective cavity 16, 32 formed by inner and outer walls **18*a*, 34*a*, 15*a* and 31*a* in reflective casing 43, first light guides 17 and 33 arranged in reflective cavities 16 and 32, first and second light-guiding fiber lenses 18 and 34 surrounded by and arranged between inner walls 18*a* and 34*a*, and photoreceivers 19 and 35 arranged coaxially with and outside first and second fiber lenses 18 and 34**.

Each of reflective casings 43 comprises a slant **18*b*, 34*b* and a flat 15*b*, 31*b* both opposite reflective cavity 16, 32 to taper off between respectively slant 18*b*, 34*b* and reflective cavity 16, 32 in a direction off partition 11, 12. First light guides 17, 33 are arranged within respectively reflective cavities 16, 32 while inner and outer surfaces of first light guides 17, 33 of oval section are in contact with respectively slant 18*b*, 34*b* of reflective casing 43 and plane surface 15*b*, 31*b* to bring first light guides 17, 33 into contact with tapered slant 18*b*, 34*b* of reflective casing 43 and plane surface 15*b*, 31*b* and to thereby certainly retain first light guide 17, 33 immovable within reflective cavity 16, 32** and rigidly supported by a backing structure not shown.

When light energy is supplied into first light guides 17, 33 retained within reflective cavities 16, 32, first light guides 17, 33 irradiate lights toward bill 21, and they are regularly (directly or mirror-) reflected at reflection points 25 on a surface of bill 21 to produce reflected lights that enter first and second fiber lenses 18 and 34 to be received by photoreceivers 19 and 35. Lights emitted from first light guides 17, 33 regularly reflect on specular points 25 of bill 21 with the equal incident and reflective angles of lights so that photoreceivers 19 and 35 may receive a full amount of regularly reflected lights with least amounts of absorbed and diffused lights even if they may occur unlike prior art bill validators that may bring diffused and irregular reflections on bill surfaces. Reflected lights would provide photoreceivers 19 and 35 with signals of marking information (printed pattern) on printed surfaces of bill 21 to forward them to a control device (not shown) that compares the marking information with predetermined data stored in a related memory device (not shown) to determine the bill's authenticity.

Each of reflective optical devices 13, 30 comprises a reflective casing 43 formed of plastic materials such as polyamide, polyacetal and ABS resins with their surface treatment for light reflex, reflective cavities 16, 32 provided in reflective casing 43, first light guides 17, 33 arranged within reflective cavities 16, 32, first and second fiber lenses 18 and 34 such as refractive-index dispersion type lenses surrounded by inner walls **18*a*, 34*a* of reflective casing 43, and photoreceivers 19 and 35 arranged in alignment with and outside of first and second fiber lenses 18 and 34**. FIG.

8 illustrates photoreceivers 19 and 35 of photodetectors such as phototransistors, photodiodes arranged in alignment with respectively first and second fiber lenses 18 and 34.

When light energy is supplied into first light guides 17, 33 retained within reflective cavities 16, 32 shown in FIG. 8, first light guides 17, 33 radiate lights toward bill 21, and they are regularly reflected at reflection points 25 on surfaces of bill 21 to produce a large amount of reflected lights that enter fiber first and second lenses 18 and 34 toward photoreceivers 19 and 35. Lights emitted from first light guides 17, 33 regularly reflect at specular points 25 on bill 21 with the equal incident and reflective angles so that photoreceivers 19 and 35 may receive a full amount of regularly reflected lights with least amounts of absorbed and diffused lights even if they may occur like prior art bill validators that may mainly bring diffused and irregular reflections on bill surfaces. Light signals reflected on surfaces of bill 21 include marking information (printed pattern) of printed surfaces that are forwarded through photoreceivers 19 and 35 to the control device (not shown) wherein it compares the marking information with predetermined data stored in the memory device (not shown) to determine the bill's authenticity.

FIG. 8 shows reflective optical devices 13, 30 arranged below and above bill passageway 20 from which a common inventive concept Idea A can be extracted. The optical sensor device for bill validation of Idea A comprises a pair of partitions 11, 12 arranged in spaced relation and in parallel to each other, a bill passageway 20 formed between partitions 11, 12, and reflective optical devices 13, 30 with lids 42 formed of light-permeable materials and arranged adjacent to and fit in openings 53 of partitions 11, 12. Each of reflective optical devices 13, 30 comprises a reflective casing 43, reflective cavity 16, 32 provided between inner and outer walls 18*a*, 34*a*, 15*a* and 31*a* of reflective casing 43, first light guides 17, 33 retained within reflective cavities 16, 32, fiber lenses 18 and 34 each surrounded by inner walls 18*a*, 34*a* of reflective casing 43, and photoreceivers 19 and 35 arranged in alignment with and outside of first and second fiber lenses 18 and 34.

Reflective casings 43 each comprise slants 18*b*, 34*b* formed on inner wall 18*a*, 34*a* opposite reflective cavities 16, 32 and plan surfaces 15*b*, 31*b* formed in outer walls 15*a*, 31*a* to taper off between slants 18*b*, 34*b* and plan surfaces 15*b*, 31*b* in a direction off partition 11, 12. Upon assemblage of reflective optical devices 13, 30, first light guides 17, 33 of oval section have inner and outer surfaces 17*a*, 17*b*, 33*a*, 33*b* that are brought into engagement with respectively slants 18*b*, 34*b* and plan surface 15*b*, 31*b* of casing 43 to arrange first light guides 17, 33 within reflective cavities 16, 32. When light energy is supplied into first light guides 17, 33, their lights illuminate bill 21 and regularly reflect at reflection points 25 on surfaces of bill 21 to generate reflective lights that go through fiber lenses 18 and 34 and enter photoreceivers 19 and 35 for light reception.

FIG. 8 also depicts an optically sensing device utilizing reflected and transmitted lights for bill validation that comprises a lower light-reflection type optical device 13 arranged beneath, outward and adjacent to a partition 11, and an upper light-transmission type optical device 14 arranged above, outward and adjacent to another partition 12. Lower optical device 13 comprises a reflective housing 43, a pair of first light guides 17 arranged within reflective cavity 16 of housing 43 for emitting lights toward surfaces of bill 21 passing through bill passageway 20, a first fiber lens 18 to allow lights irradiated from first light guides 17 and then regularly reflected on surfaces of bill 21 to pass through first fiber lens 18, and a photoreceiver 19 for receiving lights from first fiber lens 18.

Light-transmission type optical device 14 shown in FIG. 8 according to Idea B, comprises a casing 24 integral with reflective casing 43, a reflective optical device 30 and a second light guide 23 arranged within a second channel 22 formed in casing 24 for illuminating lights that directly transmit bill 21. Second light guide 23 of optical device 14 has its optical axis in alignment with that of first fiber lens 18 in lower optical device 13.

Lower and upper optical devices 13 and 30 may have basically the same structure and function. However, first fiber lens 18 has its optical axis that keeps at least at a distance from an optical axis of second fiber lens 34 in upper optical device 30 by a total summed distance of three lengths, namely (1) half-length in width of second light guide 23 in upper optical device 14, (2) width of a septum 37 and further (3) half-length in width of upper light guide 33 in upper optical device 30. During lights-out of second light guide 23, a pair of first light guides 17 simultaneously give off lights toward underside (bottom surface) of bill 21 that are regularly reflected at underside reflection points 25 of bill 21 to pass lights through first fiber lens 18 and finally enter photoreceiver 19. First light guides 17 irradiate lights along their respective optical axis, and then they are reflected at two different reflection points 25 away each other by a constant distance d on underside of bill 21. Lights reflected at reflection points 25 are introduced into first fiber lens 18 and then received by photoreceiver 19.

In this way, lights emitted from first light guides 17 regularly reflect at irradiated areas or reflection points 25 on underside of bill 21, and then go into first fiber lens 18 and photoreceiver 19. This regular light reflection effects would minimize amounts of absorbed and diffused lights on reflection points 25 to allow photoreceiver 19 to receive a full amount of regularly reflected lights unlike prior art bill validators that may mainly bring diffused and irregular reflections on surfaces of bill 21. During extinction of first light guides 17, second light guide 23 of optical device 14 gives off lights that would penetrate or go straight through bill 21 of illumination area surfaces inclusive of reflection points 25 of bill 21 and then come into photoreceiver 19 through first fiber lens 18. Lights irradiated from second light guide 23 would naturally come to carry paper quality and printed information of bill 21 within lights when they pass straight through bill 21 and besides a major amount of lights are supplied to photoreceiver 19 except slight light absorption and diffusion at reflection points 25. Accordingly, the control device that receives the information signals from photoreceiver 19, would decide the authenticity of bill 21 in view of the sufficient amount of lights transmitted through bill 21. If first and second light guides 17, 23 generate lights of the same wavelength, second light guide 23 would emit lights toward bill 21 during extinction of first light guides 17 that adversely would light during extinction of second light guide 23 to prevent malfunction by their synchronous lighting.

In this way, first and second light guides 17, 23 would light at different times to irradiate a plurality of reflection and transmitted lights toward front side and underside of the same illumination areas to receive lights from first and second light guides 17, 23 by the same photoreceiver 19, and in this case, second light guide 23 would emit straight light signals that are transmitted through bill 21 so that transmitted lights may come to carry paper quality and printed information of bill 21 while a full amount of lights may penetrate bill 21 and is received by photoreceiver 19 through first fiber lens 18 except slight light absorption and diffusion at reflection points 25. So, the control device receives information signals inclusive of paper quality and printed information to compare them with predetermined printed and paper quality data stored in a memory device in order to determine the authenticity of bill. The control device also can derive optimum validation values through a variety of arithmetic methods for computing outputs of reflected and transmitted lights of the same wavelengths detected by photoreceiver 19. Moreover, optical device 14 may adopt different lighting times between first and second light guides 17, 23 that emit lights toward underside and front side of the same illumination area to effectively prevent harmful light-interference and light pollution by light leakage.

Now, referring to the optical sensor for bill validation shown in FIG. 8 according to Idea C that utilizes a pair of lights for optically scanning both surfaces of bill, it comprises first and second reflective optical devices 13 and 30 respectively arranged below and above bill passageway 20. First optical device 13 comprises a reflective casing 43, reflective channels 16 formed in casing 43, first light guides 17 arranged within reflective channels 16 for irradiating lights toward a bottom surface of bill 21 moving through bill passageway 20, a light guide fiber lens 18 for allowing lights illuminated from first light guides 17 and regularly reflected on surfaces of bill 21 to pass through fiber lens 18, and a photoreceiver 19 for receiving lights emerged from fiber lens 18.

Second optical device 30 comprises a second reflective casing 31, reflective channels 32 formed in casing 31, second light guides 33 arranged within reflective channels 32 for irradiating lights toward a front surface of bill 21 moving through bill passageway 20, a second light guide fiber lens 34 for allowing lights illuminated from second light guides 33 and then regularly reflected on front surfaces of bill 21 to pass through fiber lens 34, and a photoreceiver 35 for receiving lights emerged from fiber lens 34. First and second optical devices 13 and 30 are arranged off each other in the transfer direction of bill 21 along scanning lines on bottom and front sides to simultaneously radiate a pair of reflective lights of the same wavelength toward bottom and front surfaces in illumination areas from first and second light guides 17 and 33.

First and second optical devices 13 and 30 are arranged respectively behind and ahead along a scanning line behind in the transfer direction of bill 21 respectively on the bottom and top sides of bill passageway 20 to produce the same validation results for user-friendliness even if bill 21 is upward or downward inserted into bill validators. In addition, as first and second optical devices 13 and 30 are arranged away from each other in the transfer direction of bill 21, the optical sensor does not produce harmful light interference or optical pollution by light leakages, even if they concurrently irradiate reflective lights of the same wavelength toward bill 21. Accordingly, if first and second optical devices 13 and 30 are arranged adversely ahead and behind in the transfer direction of bill 21, such an arsy-versy arrangement would also produce the same or similar excellent effects as above.

As to the optical sensor for bill validation shown in FIG. 8 according to Idea D for optically scanning both surfaces of bill utilizing reflective and penetrative lights, it comprises a reflective optical device 13 arranged adjacent to and outside a partition 11, and penetrative and second optical devices 14, 30 both arranged adjacent to and outside another partition 12. Reflective optical device 13 comprises a reflective casing 43, reflective channels 16 formed in casing 43, first light guides 17 arranged within reflective channels 16 for irradiating lights toward a bottom surface of bill 21 conveyed through bill passageway 20, a light guide fiber lens 18 for allowing lights illuminated from first light guides 17 and then regularly reflected on surfaces of bill 21 to pass through fiber lens 18, and a photoreceiver 19 for receiving lights emerged from fiber lens 18. Penetrative optical device 14 comprises a penetrative casing 24, a penetrative channel 22 formed in penetrative casing 24, and a penetrative optical guide 23 arranged within penetrative channel 22 for irradiating lights toward bill 21 that passes along bill passageway 20.

Second optical device 30 comprises a second reflective casing 31 for forming a reflective casing 43, reflective channels 32 formed in casing 31, second light guides 33 arranged within reflective channels 32 for irradiating lights toward a front surface of bill 21 passing through bill passageway 20, a second light guide fiber lens 34 for allowing lights illuminated from second light guides 33 and then regularly reflected on front surfaces of bill 21 to pass through fiber lens 34, and a photoreceiver 35 for receiving lights emerged from fiber lens 34.

Penetrative and reflective casings 24 and 31 are integrally formed into a composite casing 36 with a separator 37 formed between penetrative and reflective grooves 22, 32. For instance, reflective optical device 13 aims lights at the illumination areas on surfaces of bill 21 whereas second optical device 30 directs lights of the same wavelength toward the illumination areas of bill 21 on the adverse surface, and also penetrative optical guide 23 irradiates penetrative lights toward the illumination areas of bill 21 on the adverse surface during lighting times different from those of reflective optical device 13. In other words, reflective and second optical devices 13 and 30 respectively radiate lights of the same wavelength toward the illumination areas on opposite surfaces of bill 21 to each collect a pair of reflected lights from both surfaces of bill 21. Optically sensing device according to Idea D would acquire all functions and effects generated from optical sensors of Ideas A to C.

During lights out of penetrative optical guide 23, a pair of first light guides 17 aim lights at the illumination areas on a surface of bill 21 to cause lights to regularly reflect at the illumination areas to go through fiber lens 18 and enter photoreceiver 19. While some of reflected lights at the illumination areas may be lost by diffusion, scattering or absorption depending the surface condition of bill 21, a major portion of reflected lights at the illumination areas will be collected by photoreceiver 19 because a major amount of lights is regularly reflected at the illumination areas relative to lost light amount so that photoreceiver 19 can secure a maximal amount of lights reflected on bottom surface of bill 21. In addition, a pair of first light guides 17 serve to irradiate lights from two directions toward the illumination areas so that irradiated lights come to simply a double amount when using a single light guide 17, and in this context, photoreceiver 19 may take a sufficient amount of lights reflected on bill 21.

The embodiments according to the present invention may provide the following functions and effects:

1. Regular reflection effects of lights on reflection points 25 on bill's surfaces would allow photodetectors to take a maximal amount of reflected light signals that bear printed information on bill surfaces except absorbed and diffused lights for accurate bill validation;

2. A photodetector may take lights that are penetrated through a bill on reflection points to generate a maximal amount of transmitted lights inclusive of paper quality and printed information for more accurate validation of bills.
3. Photodetectors may receive several kinds of reflected lights of the same wavelength and also penetrative lights to discriminate different optical patterns of bills for improvement in validation of bills.
4. The optically sensing device may compute output values of reflected lights of the same wavelength and penetrative lights with various algorithms to derive optimum values for bill validation.
5. The sensing device may irradiate, toward a bill, reflective lights of the same wavelength different from that of penetrative lights to reduce bill validation times.
6. Reflective and penetrative optical devices may be retained into small casings to downsize the sensing device.
7. Reflective optical devices of the same optical structure are arranged on both bottom and top sides of bill passageway to produce the same validation results for user-friendliness even if bill is upward or downward inserted into the bill validator.

INDUSTRIAL APPLICABILITY

The optical sensor for bill validation according to the invention is applicable to many kinds of bill handlers such as bill validators, bill discriminators, bill counting machines, bill stackers and bill dispensers.

DESCRIPTION OF SYMBOLS (11, 12): Partitions; (13, 30): Reflective optical devices; (14): A penetrative optical device; (16, 32): Reflective channels; (17, 33): First and second light guides; (18, 34): First and second light guide fiber lenses; (19, 35): Photodetectors; (20): A bill passageway; (21): A bill; (22): A penetrative channel; (23): A penetrative light guide; (24): A penetrative casing; (25): Reflection points; (31): A second reflective casing; (36): A composite casing; (37): A separator; (40): An optical device; (41): A housing; (42): A lid; (43): A casing (A reflective casing); (44): Passage walls; (45): Lid side walls; (46): A flange; (47): Casing side walls; (48): Casing bottom walls; (53): Openings; (54): A tongue; (55): Channel-shaped notches; (60): Rugged abutments; (61): Tenons; (62): Mortices.

The invention claimed is:

1. An optical sensor for bill validation comprising:

a pair of partitions arranged in spaced and parallel relation to each other, a bill passageway defined between the pair of the partitions, and a reflection type optical device assembled in at least one of the partitions to form a part of the bill passageway, wherein:

the reflection type optical device has a housing for holding an optical component, the housing comprises a lid and a casing, the lid being formed of light-permeable materials to allow lights irradiated from the optical component and reflected on a bill to pass through the lid, and the casing enclosing the optical component in combination with the lid, the lid of the housing is fit in an opening of one of the partitions to make the lid form the part of the bill passageway, the casing comprises a casing side wall for covering side surfaces of the optical component, and a casing bottom wall for covering a bottom surface of the optical component, the casing bottom wall of the casing comprises a channel-shaped notch and a tongue formed by the channel-shaped notch, the tongue of the casing bottom wall generates its own elastic force by an elastic deformation when the optical component is mounted to forcibly urge the optical component toward the lid.

2. The optical sensor of claim 1, wherein the optical component comprises a contact image sensor, a point sensor or both of them.

3. The optical sensor of claim 1, wherein the lid has an outer surface to be flush with an outer surface of one of the partitions to define a passageway wall of the bill passageway, a lid side wall extending from the passageway wall to cover a part of side surfaces of the optical component and a flange extending from the lid side wall in parallel to the passageway wall.

4. The optical sensor of claim 3, wherein the flange of the lid is fastened to the casing side wall of the casing by removable fixing means.

5. The optical sensor of claim 3, wherein the tongue is formed to produce a resilient force to make the optical component come into close contact to the passageway wall of the lid.

6. The optical sensor of claim 1, wherein front and rear ends of the lid are formed with rugged abutments that comprise alternately concavo-convex tenons and mortices that are removably engaged with mating rugged abutments formed at longitudinal ends of the opening in one of the opposite partitions to bring outside surfaces of the lid to be flush with outer surfaces of the partitions that together define the smooth bill passageway.

7. The optical sensor of claim 1, wherein the lid of the housing is removably or securely fit in the opening of one of the partitions.

8. The optical sensor of claim 1, wherein the reflection type optical devices provided in the partitions each have the housings for holding the optical components of the same or different configurations, the reflection type optical device disposed beneath the bill passageway comprises the housing that has the lid removably fit in the opening provided in the partition, the reflection type optical device disposed above the bill passageway comprises the housing that has the lid removably fit in the openings provided in the partition to irradiate lights from each of the optical components toward bottom and upper surfaces of the bill moving through the bill passageway.

9. The optical sensor of claim 3, wherein front and rear ends of the lid are formed with rugged abutments that comprise alternately concavo-convex tenons and mortices that are removably engaged with mating rugged abutments formed at longitudinal ends of the opening in one of the opposite partitions to bring outside surfaces of the lid to be flush with outer surfaces of the partitions that together define the smooth bill passageway.

10. The optical sensor of claim 3, wherein the reflection type optical devices provided in the partitions each have the housings for holding the optical components of the same or different configurations, the reflection type optical device disposed beneath the bill passageway comprises the housing that has the lid removably fit in the opening provided in the partition, the reflection type optical device disposed above the bill passageway comprises the housing that has the lid removably fit in the openings provided in the partition to irradiate lights from each of the optical components toward bottom and upper surfaces of the bill moving through the bill passageway.

11. The optical sensor of claim 2, wherein the lid has an outer surface to be flush with an outer surface of one of the partitions to define a passageway wall of the bill passageway, a lid side wall extending from the passageway wall to cover a part of side surfaces of the optical component and a flange extending from the lid side wall in parallel to the passageway wall, and the casing comprises a casing side wall for covering another side surface of the optical component, and a casing bottom wall for covering a bottom surface of the optical component.

* * * * *